United States Patent
Okada et al.

(10) Patent No.: US 9,160,008 B2
(45) Date of Patent: Oct. 13, 2015

(54) CATHODE CATALYST LAYER, MANUFACTURING METHOD THEREOF AND MEMBRANE ELECTRODE ASSEMBLY

(75) Inventors: Saori Okada, Tokyo (JP); Haruna Kurata, Tokyo (JP); Hiroyuki Morioka, Tokyo (JP); Kenichiro Oota, Kanagawa (JP)

(73) Assignee: TOPPAN PRINTING CO., LTD (JP)

( * ) Notice: Subject to any disclaimer, the term of this patent is extended or adjusted under 35 U.S.C. 154(b) by 44 days.

(21) Appl. No.: 13/613,573

(22) Filed: Sep. 13, 2012

(65) Prior Publication Data

US 2013/0011764 A1 Jan. 10, 2013

Related U.S. Application Data

(63) Continuation of application No. PCT/JP2011/051923, filed on Jan. 31, 2011.

(30) Foreign Application Priority Data

Mar. 16, 2010 (JP) .................. 2010-058911

(51) Int. Cl.
| | |
|---|---|
| H01M 8/10 | (2006.01) |
| H01M 4/90 | (2006.01) |
| H01M 4/86 | (2006.01) |
| H01M 4/88 | (2006.01) |

(52) U.S. Cl.
CPC .......... *H01M 4/9008* (2013.01); *H01M 4/8605* (2013.01); *H01M 4/8828* (2013.01); *H01M 2008/1095* (2013.01); *Y02E 60/50* (2013.01)

(58) Field of Classification Search
CPC H01M 4/8605; H01M 4/8828; H01M 4/9008
USPC .......................................... 429/482
See application file for complete search history.

(56) References Cited

U.S. PATENT DOCUMENTS

2006/0251954 A1* 11/2006 Merzougui et al. ............. 429/44

FOREIGN PATENT DOCUMENTS

| JP | 2005-044659 | 2/2005 |
|---|---|---|
| JP | 2005-063677 | 3/2005 |
| JP | 2005-161203 | 6/2005 |
| JP | 2006-004662 | 1/2006 |
| JP | 2006-198570 | 8/2006 |
| JP | 2007-161511 | 6/2007 |

(Continued)

OTHER PUBLICATIONS

Machine translation of JP 2008-108594, obtained Apr. 9, 2014.*

(Continued)

*Primary Examiner* — Nicholas P D'Aniello
(74) *Attorney, Agent, or Firm* — Squire Patton Boggs (US) LLP (57) ABSTRACT

According to the present invention, it is possible to improve the use ratio of active sites in a catalyst having oxygen reduction activity so as to provide a cathode catalyst layer and MEA for a fuel cell with high a level of power generation performance. The present invention includes a process of introducing a functional group into a surface of the catalyst 13 which has oxygen reduction activity and a process of blending the catalyst 13 with the functional group on the surface together with an electron conductive material and a proton conductive polymer electrolyte to prepare a catalyst ink for forming the cathode catalyst layer for the fuel cell.

4 Claims, 3 Drawing Sheets

(56) References Cited

FOREIGN PATENT DOCUMENTS

| | | |
|---|---|---|
| JP | 2008-108594 | 5/2008 |
| JP | 2009-226311 | 10/2009 |
| JP | 2009-295441 | 12/2009 |
| WO | WO2009/148114 A1 | 12/2009 |

OTHER PUBLICATIONS

Machine translation of JP 2009-295441 A, obtained Mar. 10, 2015.*
A. Ishihara et al., Partially Oxidized Tantalum Carbonitrides as a New Nonplatinum Cathode for PEFC-1-, Journal of the Electrochemical Society, 155 (4), pp. B400-B406 (2008).
Notification of Reasons for Refusal for appl. No. 2011-532418, dispatched Nov. 15, 2011, 7 pgs.
Translation of the Notification of Reasons for Refusal for appl. No. 2011-532418, dispatched Nov. 15, 2011, 13 pgs.
First Office Action for Chinese Patent Application No. 2011800138020 dated Jul. 14, 2014, including English Translation.
Ishihara et al. "Tantalum oxide-based compounds as new non-noble cathodes for polymer electrolyte fuel cell," Electrochimica Acta, 2010, vol. 55, pp. 7581-7589.

* cited by examiner

CATHODE CATALYST LAYER, MANUFACTURING METHOD THEREOF AND MEMBRANE ELECTRODE ASSEMBLY

This application is a continuation of International Application No. PCT/JP2011/051923, filed Jan. 31, 2011, which is incorporated herein by reference in its entirety.

BACKGROUND OF THE INVENTION

1. Field of the Invention

The present invention relates to a cathode catalyst layer and a membrane electrode assembly (MEA) for a fuel cell. More specifically, the present invention relates to a manufacturing method of a cathode catalyst layer and MEA which provide a resultant fuel cell with a high level of power generation performance with use of a non-noble metal (or, non-platinum) catalyst having oxygen reduction activity.

2. Description of the Related Art

A fuel cell is a power generation system which produces electric power along with heat. A fuel gas including hydrogen and an oxidant gas including oxygen react together at electrodes containing a catalyst in a fuel cell so that a reverse reaction of water electrolysis takes place. A fuel cell is attracting attention as a clean energy source of the future because of advantages such as high efficiency, a small impact on the environment and a low level of noise relative to conventional power generation systems. A fuel cell is classified into several types according to an ion conductor employed therein. A fuel cell which uses a proton conductive polymer membrane is called a proton exchange membrane fuel cell (PEMFC) or a polymer electrolyte fuel cell (PEFC).

Among various fuel cells, a PEMFC (or PEFC), which can be used at around room temperature, is regarded as a promising fuel cell for use in vehicles and household stationary power supply etc. and is being developed widely in recent years. The PEMFC (or PEFC) includes a membrane electrode assembly (MEA) in which a pair of electrodes is arranged on both sides of a polymer electrolyte membrane. In the PEMFC (or PEFC), the MEA is interposed between a pair of separators, on each of which either a gas flow path for supplying a fuel gas containing hydrogen to one of the electrodes or a gas flow path for supplying an oxidant gas containing oxygen to the other electrode is formed. While one of the electrodes for supplying the fuel gas is called an anode (or fuel electrode), the other electrode for supplying the oxidant gas is called a cathode (or air electrode). In general, each of these electrodes includes a catalyst layer in which a polymer electrolyte and catalyst loaded carbon particles are contained and a gas diffusion layer which has gas permeability and electrical conductivity. A noble metal such as platinum etc. is used as the catalyst in the catalyst loaded carbon particles.

Apart from other problems such as improving durability and output density etc., cost reduction is the most major problem for putting the PEMFC (or PEFC) into practical use. Since the PEMFC (or PEFC) at present employs expensive platinum as the electrode catalyst, an alternate catalyst material is strongly desired to fully promote the PEMFC (or PEFC). As more platinum is used in the cathode (air electrode) than in the anode (fuel electrode), an alternative to platinum (namely, a non-platinum catalyst) with a high level of catalytic performance for oxygen-reduction on the cathode is particularly well under development.

A mixture of a noble metal and nitride of iron (a transition metal) described in Patent document 1 is an example of a non-platinum catalyst for the cathode. In addition, a nitride of molybdenum (a transition metal) described in Patent document 2 is another example. These catalyst materials, however, have an insufficient catalytic performance for oxygen-reduction in an acidic electrolyte and are dissolved in some cases.

Non-patent document 1 reports that a partially-oxidized tantalum carbonitride has both excellent stability and catalytic performance. This oxide type non-platinum catalyst has a high level of catalytic performance for oxygen-reduction in itself as a catalyst.

Regarding conventional platinum loaded carbon catalyst, Patent document 3 teaches a technique of improving catalyst-use efficiency by providing the carbon surface with a hydrophilic group so as to improve affinity for the proton conductive polymer electrolyte. In addition, Patent document 4 teaches a surface modified carbon which protects the surface from oxidation when a hydrophilic group is introduced to the surface of the carbon of a conventional platinum loaded carbon catalyst.

<Patent document 1>: JP-A-2005-44659.
<Patent document 2>: JP-A-2005-63677.
<Patent document 3>: JP-A-2006-4662.
<Patent document 4>: JP-A-2007-161511.
<Non-patent document 1>: "Journal of The Electrochemical Society", Vol. 155, No. 4, pp. B400-B406 (2008).

SUMMARY OF THE INVENTION

It is an object of the present invention to provide a cathode catalyst layer and an MEA for a fuel cell with a high level of power generation performance using a non-platinum oxide which has oxygen reduction activity.

Accordingly, a first aspect of the present invention includes a feature of introducing a functional group onto a surface of a catalyst which has oxygen reduction activity and contains tantalum, and mixing an electron conductive material and a proton conductive polymer electrolyte together with the catalyst, of which the functional group is introduced onto the surface, to prepare a catalyst ink for forming said cathode catalyst layer.

In addition, a second aspect of the present invention further includes a feature that the functional group is selected from the group of a sulfonate group, a phosphate group and a carboxylic group.

In addition, a third aspect of the present invention further includes a feature that the catalyst has a specific surface area in the range of 1-100 $m^2/g$ and an average particle diameter in the range of 1 nm to 3 μm.

In addition, a fourth aspect of the present invention further includes a feature that a product obtained by partially-oxidizing a carbonitride of a transition metal in an atmosphere including oxygen is used as the catalyst.

In addition, a fifth aspect of the present invention further includes a feature that a polymer or a monomer having the functional group is introduced onto the surface of the catalyst by a grafting reaction.

In addition, a sixth aspect of the present invention further includes a feature that a silane coupling agent which has the functional group or which has a capability of incorporating the functional group by a chemical reaction is used for introducing the functional group onto the surface of the catalyst.

In addition, a seventh aspect of the present invention is a cathode catalyst layer which is manufactured by the sixth aspect of the present invention.

In addition, an eighth aspect of the present invention is a membrane electrode assembly including an anode catalyst layer, the cathode catalyst layer according to the seventh aspect of the present invention and a proton conductive polymer electrolyte membrane which is interposed between the anode catalyst layer and the cathode catalyst layer.

In addition, a ninth aspect of the present invention is a cathode catalyst layer including a catalyst which contains tantalum and has oxygen reduction activity, an electron conductive material and a proton conductive polymer electrolyte, wherein a functional group is introduced into a surface of the catalyst.

In addition, a tenth aspect of the present invention further includes a feature that the functional group is selected from the group of a sulfonate group, a phosphate group and a carboxylic group.

In addition, an eleventh aspect of the present invention further includes a feature that the catalyst has a specific surface area in the range of 1-100 $m^2/g$ and an average particle diameter in the range of 1 nm to 3 μm.

In addition, a twelfth aspect of the present invention further includes a feature that a product obtained by partially-oxidizing a carbonitride of a transition metal in an atmosphere including oxygen is used as the catalyst.

In the present invention, a functional group is introduced onto a surface of the catalyst which contains tantalum and shows oxygen reduction activity so that the use ratio of active sites in the catalyst can be improved. As a result, a cathode catalyst layer and an MEA which achieve a fuel cell having a high level of power generation performance are obtained.

DESCRIPTION OF NUMERALS

12: Membrane electrode assembly (MEA)
   1: Polymer electrolyte membrane
   2: Cathode catalyst layer
   3: Anode catalyst layer
   4: Gas diffusion layer (on cathode)
   5: Gas diffusion layer (on anode)
   6: Air electrode (Cathode)
   7: Fuel electrode (Anode)
   8: Gas flow path
   9: Cooling water flow path
  10: Separator
  13: Catalyst
  14: Catalyst support

EMBODIMENT OF THE INVENTION

Figure 1:
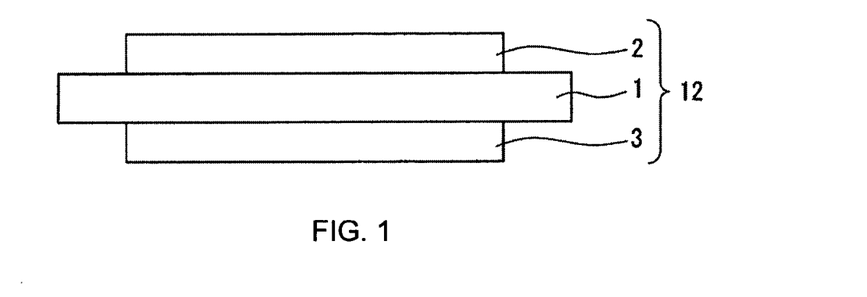
FIG. 1 is a cross sectional exemplary diagram showing an MEA in the embodiment of the present invention.
Figure 2:
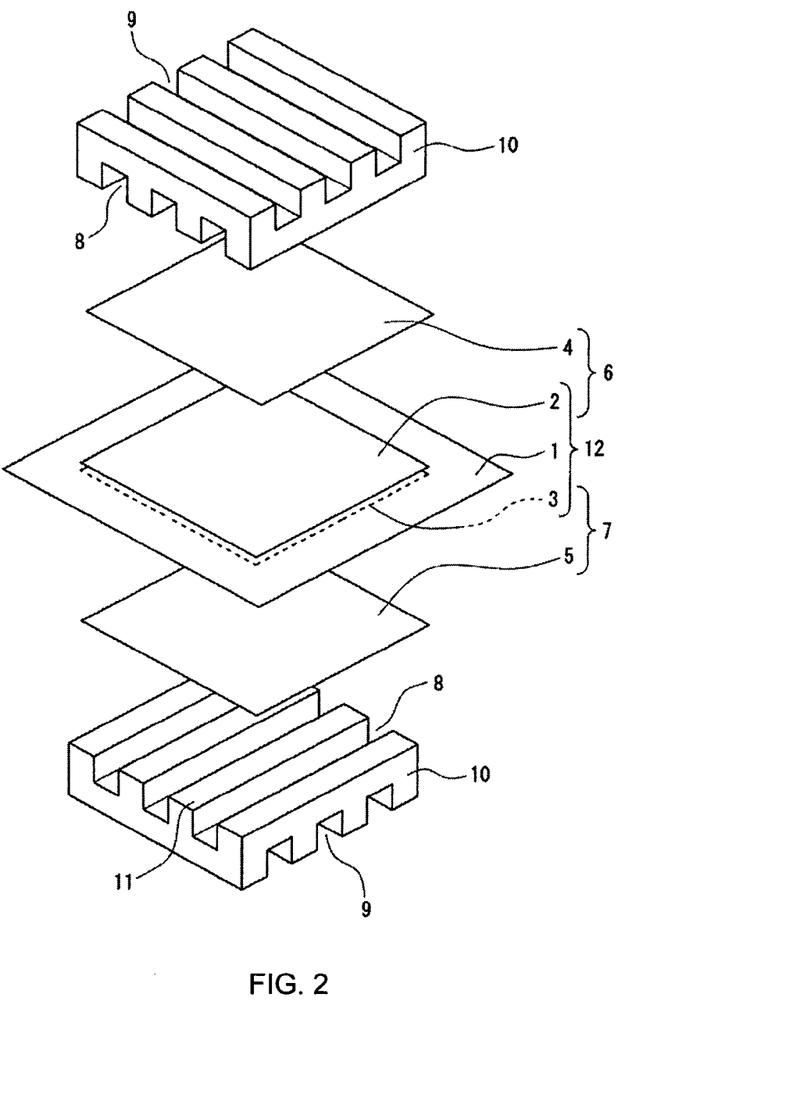
FIG. 2 is an exploded exemplary diagram of a PEMFC in the embodiment of the present invention.

An embodiment of the present invention is described referring to the drawings.
<Membrane Electrode Assembly (MEA)>
As is illustrated in FIG. 1, the MEA 12 of the present embodiment includes a polymer electrolyte membrane 1, a cathode catalyst layer 2, which is arranged on one of the surfaces of a polymer electrolyte membrane 1, and an anode catalyst layer 3, which is arranged on the other surface of the polymer electrolyte membrane 1.
<PEMFC (or PEFC)>
In the fuel cell of the present embodiment, a gas diffusion layer 4 of the air electrode is disposed facing the cathode catalyst layer 2 in the MEA 12 while a gas diffusion layer 5 of the fuel electrode is disposed facing the anode catalyst layer 3, as is illustrated in FIG. 2 as an exploded diagram. This is the structure of the air electrode (or cathode) and the fuel electrode (or anode), respectively. In addition, the fuel cell of the present embodiment includes a pair of separators 10, each of which is arranged facing gas diffusion layers 4 and 5 respectively. On each of the separators 10, a gas flowing path 8 is formed on a surface which faces the gas diffusion layer while a cooling water flow path 9 is formed on the other surface. The separator 10 is made of a conductive and impermeable material.

A fuel gas, for example, hydrogen gas is supplied through the gas flow path 8 on the separator 10 of the fuel electrode 7. An oxidant gas, for example, a gas which contains oxygen is supplied through the gas flow path 8 on the separator 10 of the air electrode 6. The fuel gas such as hydrogen and the oxidant gas such as oxygen react together under a presence of the catalyst in the fuel so that an electromotive force can be developed between the fuel electrode and the air electrode.

The fuel cell illustrated in FIG. 2 is one of a so-called "unit cell" structured fuel cell, in which the polymer electrolyte membrane 1, the cathode catalyst layers 2, the anode catalyst layer 3 and the gas diffusion layers 4 and 5 are interposed between the pair of separators 10. Nevertheless a so-called stack structured fuel cell, in which a plurality of unit cells is stacked via the separator 10, is also included in the present invention.
<Manufacturing Method of a Cathode Catalyst Layer>
A cathode catalyst layer of the present embodiment, a cathode catalyst layer which contains the catalyst 13 having oxygen reduction activity, an electron conductive material and a proton conductive polymer electrolyte is manufactured, for example, by a process of introducing a functional group and a process of blend and fabrication described as follows.

The process of introducing a functional group is a process in which a functional group is introduced into a surface of the catalyst 13 having oxygen reduction activity. The process of blend and fabrication is a process in which the catalyst 13 is blended together with an electron conductive material and a proton conductive polymer electrolyte after the functional group is introduced in order to prepare a catalyst ink for forming the cathode catalyst layer and in which the catalyst ink is coated and dried etc. so that the cathode catalyst layer is eventually formed.

It is possible to improve wettability of the surface of the catalyst 13 to the proton conductive polymer electrolyte by the process of introducing the functional group (when the cathode catalyst is formed after the catalyst 13, the electron conductive material and the proton conductive polymer electrolyte are blended together). As a result, since the use ratio of the active sites in the catalyst 13 having oxygen reduction activity is improved, a cathode catalyst layer and an MEA which achieve high power generation performance of fuel cell can be obtained.

In the process of introducing the functional group, it is preferable that at least one of the functional groups selected from the group of a sulfonate group, a phosphate group and a carboxylic group is used as the functional group of the embodiment although the functional group is not limited to these as long as affinity for the proton conductive polymer electrolyte is improved. In addition, an amount of the functional group introduced into the surface of the catalyst is not necessarily limited to a certain range. The amount of the functional group can vary according to a type of the catalyst 13.

The process of introducing the functional group is not particularly limited if, for instance, a polymer or a monomer having the functional group is introduced into the surface of the catalyst by grafting. For example, in the case where a polymer having the functional group is introduced into the surface of the catalyst 13 by graft polymerization, there is no limitation to a site at which the functional group is located. The site can be any of the following: the end of the main chain, in the middle of the main chain and in a side chain etc.

There is no particular limitation to the monomer having the functional group as long as the monomer definitely has the functional group. Examples of the monomer are acrylamide-2-methylpropane sulfonic acid, vinyl sulfonic acid, methane sulfonic acid, benzene sulfonic acid, isoprene sulfonic acid, p-toluene sulfonic acid and styrene sulfonic acid etc.

Examples of the polymer having the functional group are homopolymers of the monomers recited above and copolymers of any combination of the monomers recited above etc.

In addition, the process of introducing the functional group may also be performed by such a method that a polymer is preliminarily introduced by graft polymerization into the surface of the catalyst 13 followed by introducing the functional group into the end of the main chain of the polymer, in the middle of the main chain of the polymer, or in a side chain of the polymer etc. by a conventional method.

The process of introducing the functional group may include a process in which a silane coupling agent having the functional group is preferably used. The silane coupling agent having the functional group is chemically bonded to the catalyst 13 so that an affinity of the catalyst for the proton conductive polymer electrolyte can be effectively improved.

Figure 3:
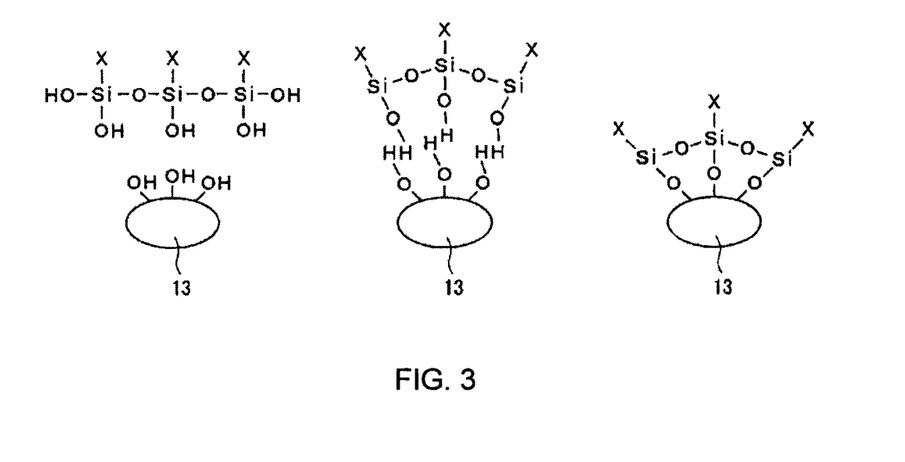
FIG. 3 is an example of a view of a catalyst into which a functional group is introduced on the surface in the embodiment of the present invention.

In a molecule of the silane coupling agent, a hydrolytic group "—OR" and a functional group "—X" which is expected to react with or to have an interaction with an organic compound is included. Because of this specific structure, the silane coupling agent can improve an affinity of an inorganic material to an organic resin. The silane coupling agent is hydrolyzed with water to produce silanol, which is chemically active. Some of the silanol condenses into an oligomer and is adsorbed to a surface of the catalyst 13 by hydrogen bonding. Then after a drying treatment, a strong connection of covalent bonding is formed by a dehydration-condensation reaction, as is illustrated in FIG. 3.

In the process of introducing the functional group, in the case where a silane coupling agent having a sulfonate group is used, the sulfonate group would promote a hydrolysis reaction of the silane coupling agent itself. In other words, it is impossible to synthesize a sufficiently-stable silane coupling agent having a sulfonate group.

Accordingly, in the process of introducing a sulfonate group, a silane coupling agent having a pre-sulfonate group, which can be transformed into a sulfonate group, should be used. After the pre-sulfonate group is introduced into a surface of the catalyst 13, the pre-sulfonate group can be transformed into the sulfonate group so that the process of introducing the sulfonate group into the surface of the catalyst 13 (maybe an inorganic powder) is achieved.

To be specific, for example, the following method can be adopted: synthesize a silane coupling agent having a sulfonic acid ester group, and after performing a surface treatment with the silane coupling agent on the surface of the catalyst 13, transform the sulfonic acid ester group into a sulfonate group by heat decomposition. Alternatively, a silane coupling agent having either a thiol group or a sulfide group can be synthesized. Then, after coating the silane coupling agent on the surface of the catalyst 13, the thiol group or the sulfide group can be transformed into a sulfonate group by exposing them to an oxidative condition.

Any of (1) wet method and (2) dry method can be used for performing the surface treatment on the catalyst with the silane coupling agent. Regardless of this, it may be more preferable to use the (1) wet method since the (2) dry method has the disadvantage of being difficult to uniformly coat on the surface. Depending on a type of the catalyst 13, particles may agglutinate. In such a case, it is preferable to arrange a mechanical dispersion by a disperser.

There is no limitation with respect to the silane coupling agent having the sulfonic acid ester group. An alkoxysilane having an isopropyl sulfonate group is particularly preferable because of its thermal decomposability. Examples of such a silane coupling agents are 3-mercaptopropylmethyldimethoxysilane, 3-mercaptopropyltrimethoxysilane, vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, bis(triethoxysilylpropyl)tetrasulfide and 3-isocyanatepropyltriethoxysilane etc.

It is also possible to use a conventional method of introducing a sulfonate group by treating with sulfuric acid gas, fuming sulfuric acid or sulfuric acid etc. as the process of introducing a sulfonate group.

It is preferable that the catalyst 13 of the present embodiment has a specific surface area in the range of 1-100 $m^2/g$ and an average particle size (diameter) in the range of 1 nm to 3 μm, and more preferably in the range of 2-50 nm. If the particle size is smaller than 1 nm, a problem of agglutination of the catalyst 13 occurs. On the other hand, the catalyst activity per unit volume may become insufficient due to a shortage of specific surface area if the particle size is larger than 3 μm.

In the manufacturing method of the cathode catalyst layer of the present embodiment, there is no limitation with respect to the electron conductive material. In general, carbon particles are preferably used as the electron conductive material. Any carbon particles can be used as long as they have a particulate shape and have conductivity and chemical stability to the catalyst. For example, carbon blacks, graphites, black leads, active carbons, carbon fibers, carbon nanotubes and fullerenes are preferably used. Carbon powders having a particle size in the range about 10-100 nm, which is smaller than that of the catalyst 13, are preferably used because electron conductivity in the cathode catalyst layer is ensured. In addition, a sulfated zirconia which has both sufficient electron conductivity and acid resistivity can also be preferably used.

Figure 4:
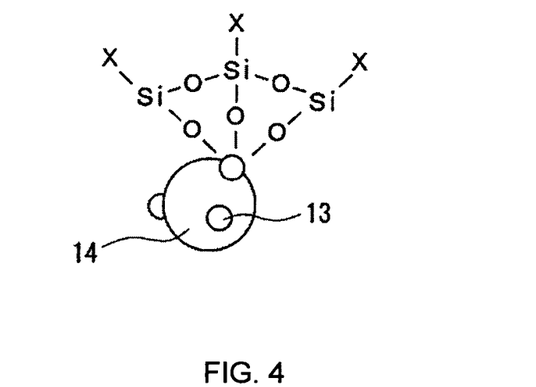
FIG. 4 is an example of a view of a catalyst which is loaded on (or supported by) an electron conductive material in the embodiment of the present invention.

It is more preferable that the catalyst 13 of this embodiment is supported by (or loaded on) an electron conductive material, as is illustrated in FIG. 4, than unsupported because a three-phase boundary is better formed. Nevertheless, it is unnecessary for the catalyst 13 to be supported by the electron conductive material if the catalyst 13 has electron conductivity by itself. The numeral 14 in FIG. 4 refers to the electron conductive material as the catalyst support.

A generally used catalyst can be used as the catalyst 13 of this embodiment. A catalyst which contains at least one transition metal selected from the group of Ta, Nb, Ti and Zr, which are used as an alternate to Pt in a positive electrode (or cathode) of PEMFC, can be used as the catalyst 13. In particular, a catalyst containing Ta is preferable as the catalyst 13.

In addition, a product compound made by partially-oxidizing a carbonitride of these transition metals in an atmosphere including oxygen is preferably used.

More specifically, TaCNO, which is obtained by partially-oxidizing tantalum carbonitride (TaCN), having a specific surface area, for example, in the range of 1-100 $m^2/g$ is preferable.

An MEA and a fuel cell of the embodiment are described in detail below.

Any material having proton conductivity may be used as the polymer electrolyte membrane of this embodiment. For instance a fluoropolymer electrolyte and a hydrocarbon polymer electrolyte can be used. Examples of the fluoropolymer electrolyte are Nafion® (made by Du Pont), Flemion® (made by ASAHI GLASS CO., LTD.), Aciplex® (made by Asahi KASEI Cooperation), and GORE-SELECT® (by W. L. Gore & Associates Inc.) etc. Examples of the hydrocarbon polymer electrolyte are an electrolyte of sulfonated polyether ketone, sulfonated polyether sulfone, sulfonated polyether ether sulfone, sulfonated polysulfide, and sulfonated polyphenylene etc. Among others, materials of Nafion® series made by Du Pont can preferably be used as the polymer electrolyte membrane.

Any material having proton conductivity may be used as a polymer electrolyte contained in a catalyst ink (described in detail later) of this embodiment, and fluoropolymer electrolytes and hydrocarbon polymer electrolytes similar to those of the polymer electrolyte membrane can be used. For example, materials of Nafion® series made by Du Pont etc. can be used as the fluoropolymer electrolyte. Electrolytes of sulfonated polyether ketone, sulfonated polyether sulfone, sulfonated polyether ether sulfone, sulfonated polysulfide, and sulfonated polyphenylene etc. can be used as the hydrocarbon polymer electrolyte. Among others, materials of Nafion® series made by Du Pont can preferably be used as the polymer electrolyte. It is preferable that the same material used as the polymer electrolyte membrane is employed in consideration of adhesion between the catalyst layer and the polymer electrolyte membrane.

A solvent in which the polymer electrolyte is dissolved with high fluidity or dispersed as a fine gel and yet in which the catalyst and the polymer electrolyte do not corrade can be used as a solvent of the catalyst ink. It is preferable that the solvent contains at least one volatile organic solvent. Alcohols such as methanol, ethanol, 1-propanol, 2-propanol, 1-butanol, 2-butanol, isobutyl alcohol, tert-butyl alcohol and pentanol etc., ketone solvents such as acetone, methyl ethyl ketone, pentanone, methyl isobutyl ketone, heptanone, cyclohexanone, methyl cyclohexanone, acetonyl acetone and diisobutyl ketone etc., ether solvents such as tetrahydrofuran, dioxane, diethylene glycol dimethyl ether, anisole, methoxytoluene and dibutyl ether etc., and other polar solvents such as dimethylformamide, dimethylacetamide, N-methylpyrrolidone, ethylene glycol, diethylene glycol, diacetone alcohol and 1-methoxy-2-propanol etc. are often used although the solvent is not limited to these. In addition, any solvent mixture of a combination of a plurality of these solvents may also be used as the solvent.

In addition, solvents of a lower alcohol have a high risk of igniting. When using one of such solvents, a mixture with water is preferably used as the solvent since water which is highly soluble in the polymer electrolyte can be contained without serious problems. There is no particular limitation to a water additive amount unless the polymer electrolyte is separated from the solvent to generate white turbidity or turn into a gel.

In the manufacturing method of the cathode catalyst layer of the present embodiment, a catalyst ink in which the catalyst 13, the electron conductive material and the polymer electrolyte are dispersed in a solvent is prepared in the process of blend and fabrication. In preparation of the catalyst ink, it is preferable that the catalyst 13 and the electron conductive material are preliminarily mixed together without any solvent before they are dispersed in the solvent together with the polymer electrolyte. It is possible to strongly combine both powders of the catalyst 13 and the electron conductive material by a mechanochemical effect by mixing them together without a solvent. Examples of the electron conductive material are a conductive polymer and a carbon powder etc. A carbon powder is particularly preferable.

A dispersant may be contained in the catalyst ink in order to disperse the catalyst 13 and the carbon particles. An anion surfactant, a cation surfactant, an amphoteric (or ampholytic) surfactant and a non-ionic surfactant etc. can be used as the dispersant.

Specifically, for example, carboxylate type surfactants such as alkyl ether carbonates, ether carbonates, alkanoyl sarcosinesi, alkanoyl glutaninates, acyl glutaninates, oleic acid N-methyltaurine, potassium oleate diethanolamine salts, alkyl ether sulfate triethanolamine salts, polyoxyethylene alkyl ether sulfate triethanolamine salts, amine salts of specialty modified polyether ester acids, amine salts of higher fatty acid derivatives, amine salts of specialty modified polyester acids, amine salts of large molecular weight polyether ester acids, amine salts of specialty modified phosphate esters, amideamine salts of large molecular weight polyether ester acids, amide-amine salts of specialty aliphatic acid derivatives, alkylamine salts of higher fatty acids, amide-amine salts of large molecular weight polycarboxylic acids, sodium laurate, and sodium stearate, sodium oleate etc., sulfonate type surfactants such as dialkylsulfosuccinates, salts of 1,2-bis(alkoxycarbonyl)-1-ethanesulfonic acid, alkylsulfonates, paraffin sulfonates, alpha-olefin sulfonates, linear alkylbenzene sulfonates, alkylbenzene sulfonates, polynaphthylmethane sulfonates, naphthalenesulfonate-formaline condensates, alkylnaphthalene sulfonates, alkanoylmethyl taurides, sodium salt of lauryl sulfate ester, sodium salt of cetyl sulfate ester, sodium salt of stearyl sulfate ester, sodium salt of oleyl sulfate ester, lauryl ether sulfate ester salt, sodium alkylbenzene sulfonates, and oil-soluble alkylbenzene sulfonates etc., sulfate ester type surfactants such as alkylsulfate ester salts, alkyl sulphates, alkyl ether sulphates, polyoxyethylene alkyl ether sulfates, alkyl polyethoxy sulfates, polyglycol ether sulfates, alkyl polyoxyethylene sulfates, sulfonate oil, and highly sulfonated oil etc., phosphate ester type surfactants such as monoalkyl phosphates, dialkyl phosphates, monoalkyl phosphate esters, dialkyl phosphate esters, alkyl polyoxyethylene phosphates, alkyl ether phosphates, alkyl polyethoxy phosphates, polyoxyethylene alkyl ethers, alkylphenyl polyoxyethylene phosphate, alkylphenyl ether phosphates, alkylphenyl polyethoxy phosphates, polyoxyethylene alkylphenylether phosphates, disodium salts of higher alcohol phosphate monoester, disodium salts of higher alcohol phosphate diester, and zinc dialkyl dithiophosphate etc. can be used as the anion surfactant mentioned above.

For example, benzyldimethyl [2-{2-(p-1,1,3,3-tetramethylbutylphenoxy)ethoxy}ethyl]ammonium chloride, octadecylamine acetate, tetradecylamine acetate, octadecyltrimethylammonium chloride, beef tallow trimethylammonium chloride, dodecyltrimethylammonium chloride, palm trimethylammonium chloride, hexadecyltrimethylammonium chloride, behenyltrimethylammonium chloride, palm dimethylbenzylammonium chloride, tetradecyldimethylbenzylammonium chloride, octadecyldimethylbenzylammonium chloride, dioleyldimethylammonium chloride, 1-hydroxyethyl-2-beef tallow imidazoline quaternary salt, 2-heptadecenyl-hydroxyethyl imidazoline, stearamideethyldiethylamine acetate, stearamideethyldiethylamine hydrochloride, triethanolamine monostearate formate, alkylpyridium salts, higher alkylamine-ethylene oxide adducts, polyacrylamide amine salts, modified polyacrylamide amine salts, and perfluoroalkyl quaternary ammonium iodide etc. can be used as the cation surfactant stated above.

For example, dimethyl cocobetaine, dimethyl lauryl betaine, sodium laurylaminoethyl glycine, sodium laurylaminopropionate, stearyl dimethyl betaine, lauryl dihydroxyethyl betaine, amide betaine, imidazolinium betaine, lecithin, sodium 3-(ω-fluoroalkanoyl-N-ethylamino)-1-propane sulfonate, and N-{3-(perfluorooctanesulfoneamide) propyl}-N,N-dimethyl-N-carboxymethylene ammonium betaine etc. can be used as the zwitterionic surfactant mentioned above.

For example, coconut fatty acid diethanolamide (1:2 type), coconut fatty acid diethanolamide (1:1 type), beef tallowate diethanolamide (1:2 type), beef tallowate diethanolamide (1:1 type), oleic acid diethanolamide (1:1 type), hydroxyethyl laurylamine, polyethylene glycol laurylamine, polyethylene glycol cocoamine, polyethylene glycol stearylamine, polyethylene glycol beef tallow amine, polyethylene glycol beef tallow propylenediamine, polyethylene glycol dioleylamine, dimethyllaurylamine oxide, dimethylstearylamine oxide, dihydroxyethyllaurylamine oxide, perfluoroalkylamine oxides, polyvinylpyrrolidone, higher alcohol-ethylene oxide adducts, alkyl phenol-ethylene oxide adducts, fatty acid-ethylene oxide adducts, propylene glycol-ethylene oxide adduct, fatty acid esters of glycerin, fatty acid esters of pentaerithritol, fatty acid esters of sorbitol, fatty acid esters of sorbitan, and fatty acid esters of sugar etc. can be used as the nonionic surfactant mentioned above.

Among these surfactants, sulfonate type of anion surfactants such as alkylbenzene sulfonic acids, oil soluble alkylbenzene sulfonic acids, α-olefin sulfonic acids, sodium alkylbenzene sulfonates, oil soluble alkylbenzene sulfonates, and α-olefin sulfonates are preferable considering aspects such as a dispersing effect for carbons and the influence of residual dispersant on catalyst performance.

The catalyst ink, which is prepared in the process of blend and fabrication, receives a dispersion treatment if necessary. Particle-size and viscosity of the catalyst ink can be controlled by a condition of the dispersion treatment. It is possible to perform the dispersion treatment by various types of equipment. Treatments by a ball mill, a roll mill, a shear mill and a wet type mill, and an ultrasonic dispersion treatment etc. are examples. Alternatively, a homogenizer that performs agitation by a centrifugal force may be used in the dispersion treatment.

It is preferable that the amount of solid content in the catalyst ink is in the range of 1-50% by weight. In the case where the amount of solid content is excessively large, cracks tend to be easily created on a surface of the catalyst layer since the viscosity of the catalyst ink is too high. On the other hand, in the case where the amount of solid content is too small, a forming rate of the catalyst layer becomes too low to ensure reasonable productivity. The catalyst, the carbon particles and the polymer electrolyte are included in the solid content. The one containing a higher amount of the carbon particles has higher viscosity, and vice versa when comparing the catalyst inks containing the same amounts of the solid content. Hence, it is preferable that a ratio of the carbon particles with respect to a total solid content is appropriately adjusted within the range of 10-80% by weight. At this time, the viscosity of the catalyst ink is preferably in the range of 0.1-500 cP, and more preferably in the range of 5-100 cP. In addition, a dispersant may be added to the catalyst ink in order to control the viscosity when dispersing the solid content therein.

In addition, the catalyst ink may include a pore forming agent. Fine pores are created by removing the pore forming agent after the catalyst is formed. Examples of the pore forming agent are materials soluble in acid, alkali or water, sublimation materials such as camphor, and materials which decompose by heat. If the pore former is soluble in warm water, it can be removed by water produced during the power generation.

Inorganic salts (soluble to acid) such as calcium carbonate, barium carbonate, magnesium carbonate, magnesium sulfate, and magnesium oxide etc., inorganic salts (soluble to alkali aqueous solution) such as alumina, silica gel, and silica sol etc., metals (soluble to acid and/or alkali) such as aluminum, zinc, tin, nickel, and iron etc., inorganic salts (soluble to water) aqueous solutions of sodium chloride, potassium chloride, ammonium chloride, sodium carbonate, sodium sulfate, and monobasic sodium phosphate etc., and water soluble organic compounds such as polyvinyl alcohol, and polyethylene glycol etc. are available as the pore forming agent soluble in acid, alkali or water. Not only a single material but a plurality of these together can effectively be used.

In a process of fabricating the catalyst layer from the catalyst ink in the manufacturing method of the catalyst layer of the present embodiment, the catalyst ink is coated on the substrate and dried so that the catalyst layer is formed. In the case where a gas diffusion layer or a transfer sheet is used as the substrate, the catalyst layer is transferred to and combined with each of both surfaces of the polymer electrolyte membrane. In addition, in an MEA of the present invention, it is also possible to use a polymer electrolyte membrane as the substrate, coat the catalyst ink directly on both surfaces of the polymer electrolyte membrane and directly form the catalyst layers on the polymer electrolyte membrane.

At this time, a doctor blade method, a dipping method, a screen printing method, a roll coating method and a spray method etc. can be used as the coating method. Among these, the spray method such as, for example, a pressure spray method, an ultrasonic spray method, and an electrostatic spray method etc. has an advantage that agglutination hardly occurs when drying the coated catalyst ink so that a homogenized and highly porous electrode catalyst layer is obtained.

A gas diffusion layer, a transfer sheet or a polymer electrolyte membrane can be used as the substrate in the manufacturing method of the catalyst layer of the present embodiment.

The transfer sheet which is used as the substrate is principally made of a material having good transfer properties. For example, fluororesins such as ethylene tetrafluoroethylene copolymer (ETFE), tetrafluoroethylene hexafluoroethylene copolymer (FEP), tetrafluoroethylene perfluoroalkyl vinyl ether copolymer (PFA), and polytetrafluoroethylene (PTFE)

etc. can be used. In addition, polymer sheets or polymer films such as polyimide, polyethylene terephthalate (PET), polyamide (nylon), polysulfone (PSF), polyethersulfone (PES), polyphenylene sulfide (PPS), polyether ether ketone (PEEK), polyetherimide (PEI), polyarylate (PAR), and polyethylene naphthalate (PEN) etc. can be used as the transfer sheet. In the case where such a transfer sheet is used as the substrate, it is possible to peel off and remove the transfer sheet after the catalyst layer is stuck to the polymer electrolyte membrane so as to make an MEA in which catalyst layers are arranged on both sides of the polymer electrolyte membrane.

A material having gas diffusion properties and electrical conductivity can be used as a gas diffusion layer. Specifically, a carbon cloth, a carbon paper and a porous carbon such as unwoven carbon fabric can be used as the gas diffusion layer. Such a gas diffusion layer can also be used as the substrate. In the case where a gas diffusion layer is used as the substrate, it is unnecessary to peel off the substrate which acts as the gas diffusion layer after the catalyst layer is stuck to the polymer electrolyte membrane.

In the case where the gas diffusion layer is used as the substrate, a filling (or sealing) layer may preliminarily be formed on the gas diffusion layer before the catalyst ink is coated. The filling (or sealing) layer is formed to prevent the catalyst ink from seeping into the gas diffusion layer. If the filling layer is preliminarily formed, the catalyst ink is accumulated on the filling layer and a three-phase boundary is formed even when a small amount of the catalyst ink is coated. Such a filling layer can be formed, for example, by dispersing carbon particles in a fluororesin solution and sintering the solution at a temperature higher than the melting point of the fluororesin. Polytetrafluoroethylene (PTFE) etc. can be used as the fluororesin.

A carbon separator and a metal separator etc. can be used as the separator 10 in the present embodiment. The separator 10 may incorporate the gas diffusion layer. In the case where the separator 10 or the catalyst layer also acts as the gas diffusion layer, it is unnecessary to arrange any separate gas diffusion layers. A fuel cell can be fabricated by joining additional equipment such as gas supply equipment and cooling equipment etc. to the MEA having such components described above.

EXAMPLES

A specific example and comparative example of a cathode catalyst layer and an MEA of the present invention will be described below. The present invention, however, is not limited by the example below.

An example and a comparative example are described.

Example

Providing a Catalyst Surface with a Functional Group

Partially oxidized tantalum carbonitride (TaCNO, specific surface area: 9 m$^2$/g) was used as a catalyst 13. After mercapto groups were introduced into a surface of the catalyst 13 using 3-mercaptopropyltrimethoxysilane, the —SH groups were oxidized to sulfonate groups. Any silane coupling agent having the same functional group might be used as an alternative to the agent cited in this example.
<Preparing a Catalyst Ink for a Cathode Catalyst Layer>

The catalyst 13 which was provided with the sulfonate groups on the surface, a carbon black (Ketjen Black, product code: EC-300J, made by Lion Corporation, specific surface area: 800 m$^2$/g) and a 20% by weight solution (solvent: IPA, ethanol and water) of a proton conductive polymer electrolyte (Nafion®, made by DuPont) were mixed and kneaded together by a planetary ball mill (product code: P-7, by Fritsch Japan Co., Ltd). A zirconia pot and zirconia balls were used for the ball mill. The resultant catalyst ink had 0.25:1 by weight composition ratio between the catalyst 13 which was provided with the sulfonate groups on the surface and the carbon black. In addition, the resultant catalyst ink had 1:1 by weight composition ratio between the proton conductive polymer electrolyte and the carbon black. A solvent mixture of 1:1 by volume of ultrapure water and 1-propanol was used as the solvent.
<Forming Method of a Cathode Catalyst Layer>

The catalyst ink was coated on a transfer sheet by a doctor blade and dried under atmosphere at 80° C. for five minutes. The catalyst ink was coated to obtain a cathode catalyst layer 2 having such a thickness that an amount of the catalyst which was loaded on the resultant cathode catalyst layer in all was 1 mg/cm$^2$.

Comparative Example

Preparing a Catalyst Ink for a Cathode Catalyst Layer

A catalyst ink was prepared in the same way as in the Example described above except for the absence of the process of providing the catalyst 13 with the sulfonate groups on the surface.
<Forming a Cathode Catalyst Layer>

The catalyst ink was coated on the transfer sheet and dried in the same way as in Example. A cathode catalyst layer 2 was formed by adjusting the thickness in such a way that an amount of the catalyst which was loaded on the cathode catalyst layer in all was 1 mg/cm$^2$.
<<Forming an Anode Catalyst Layer>>

An anode catalyst layer is formed as described below in the Example and Comparative example. A platinum loaded carbon catalyst (amount of loaded platinum: 50% by weight to the whole, product code: TEC10E50E, made by Tanaka Kikinzoku Kogyo K.K.) and a 20% by weight solution (solvent: IPA, ethanol and water) of a proton conductive polymer electrolyte (Nafion®, made by DuPont) were mixed together in a solvent followed by performing a dispersion treatment by a planetary ball mill (product code: P-7, by Fritsch Japan Co., Ltd). The dispersion treatment was performed for 60 minutes. The resultant catalyst ink had 1:1 by weight composition ratio between the carbon in the platinum loaded carbon catalyst and the proton conductive polymer electrolyte. A solvent mixture of 1:1 by volume of ultrapure water and 1-propanol was used as the solvent. The resultant catalyst ink had 10% by weight of solid content. The catalyst ink was coated on a substrate and dried in a similar way to the case of the cathode catalyst layer 2. The anode catalyst layer 3 was formed by adjusting the thickness in such a way that an amount of the catalyst which was loaded on the layer in all was 0.3 mg/cm$^2$.
<<Fabricating a Membrane Electrode Assembly>>

The substrate on which the cathode catalyst layer 2 was formed described in the Example and Comparative example and the substrate on which the anode catalyst layer 3 was formed described above were respectively stamped out in a 5 cm$^2$ square shape and arranged facing both surfaces of a polymer electrolyte membrane (Nafion®212, made by DuPont). Subsequently, hot pressing was performed at 130° C. for ten minutes to obtain an MEA 12. After arranging a pair of carbon cloths having a filler layer as gas diffusion layers on the both surfaces, the resultant MEA 12 was further interposed between a pair of separators 10 so that a single cell of PEMFC or PEFC was fabricated.

<<Power Generation Performance>>

Measurement conditions and results of the power generation performance are described below.

<Measurement>

The power generation performance was measured under a condition of 80° C. cell temperature and 100% RH (relative humidity) both in the anode and cathode using a fuel cell test apparatus GFT-SG1 made by Toyo Corporation. Pure hydrogen as a fuel gas and pure oxygen as an oxidant gas were used and controlled to flow at a constant rate. Back pressures on the anode (fuel electrode) side and the cathode (air electrode) side were 200 kPa and 300 kPa, respectively.

<Result>

Figure 5:
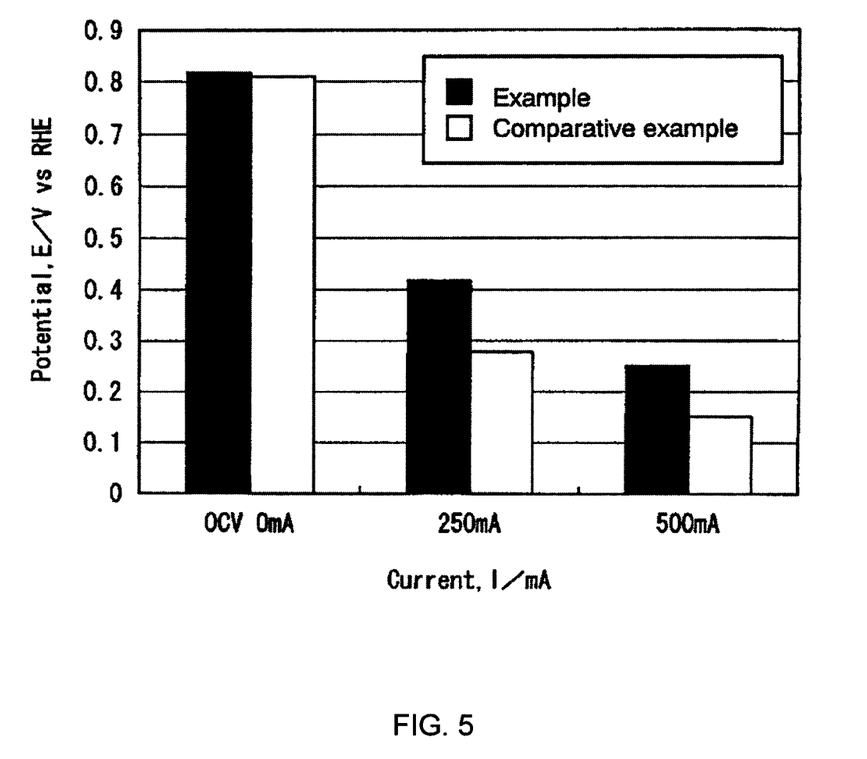
FIG. 5 is a graph showing a result of the examples.

The results are shown in FIG. 5.

It was confirmed that the MEA obtained in the Example had a higher voltage when a current was 250 mA and 500 mA than the MEA obtained in the Comparative example regardless of having approximately the same level of open-circuit voltage (OCV).

This is because the affinity of the catalyst 13 for the proton conductive polymer electrolyte was increased by introducing the functional group into a surface of the catalyst 13 so that the use ratio of active sites in the catalyst 13 was improved. As a result, a cathode catalyst layer and an MEA for a fuel cell with a high level of power generation performance were obtained.

What is claimed is:

1. A cathode catalyst layer comprising:
   a non-platinum catalyst which contains at least one transition metal selected from the group of Ta, Nb, Ti and Zr and has oxygen reduction activity;
   an electron conductive material supporting the non-platinum catalyst; and
   a proton conductive polymer electrolyte,
   wherein a silane coupling agent having a functional group is chemically bonded to a surface of said non-platinum catalyst,
   wherein said non-platinum catalyst is partially-oxidized and
   wherein said functional group is selected from the group of a sulfonate group, a phosphate group and a carboxylic group.

2. The cathode catalyst layer according to claim 1, wherein said non-platinum catalyst has a specific surface area in the range of 1-100 $m^2/g$ and an average particle diameter in the range of 1 nm to 3 μm.

3. A membrane electrode assembly comprising:
   an anode catalyst layer;
   the cathode catalyst layer according to claim 1; and
   a proton conductive polymer electrolyte membrane which is interposed between said anode catalyst layer and said cathode catalyst layer.

4. A method for forming the cathode catalyst layer of claim 1, the method comprising:
   introducing a functional group into a surface of a catalyst, the catalyst containing at least one transition metal selected from the group of Ta, Nb, Ti and Zr and having oxygen reduction activity;
   preparing a catalyst ink in which the catalyst, an electron conductive material and a proton conductive polymer electrolyte is dispersed in a solvent;
   and
   forming a cathode catalyst layer transfer sheet by applying the catalyst ink to a sheet and drying the catalyst ink.

* * * * *